United States Patent
Boon

(10) Patent No.: US 12,435,288 B2
(45) Date of Patent: Oct. 7, 2025

(54) USE OF ORGANIC NITRATE AND/OR PEROXIDE ADDITIVES AND METHOD BASED THEREON FOR DEPOSIT REDUCTION IN POST DIESEL-COMBUSTION SYSTEMS

(71) Applicant: INNOSPEC LIMITED, Ellesmere (GB)

(72) Inventor: Philip John Boon, Ellesmere (GB)

(73) Assignee: INNOSPEC LIMITED, Ellesmere Port (GB)

( * ) Notice: Subject to any disclaimer, the term of this patent is extended or adjusted under 35 U.S.C. 154(b) by 0 days.

(21) Appl. No.: 18/293,541

(22) PCT Filed: Sep. 23, 2022

(86) PCT No.: PCT/GB2022/052424
§ 371 (c)(1),
(2) Date: Jan. 30, 2024

(87) PCT Pub. No.: WO2023/047134
PCT Pub. Date: Mar. 30, 2023

(65) Prior Publication Data
US 2024/0301311 A1    Sep. 12, 2024

(30) Foreign Application Priority Data
Sep. 24, 2021  (GB) ..................................... 2113683

(51) Int. Cl.
*C10L 1/23*     (2006.01)
*C10L 1/18*     (2006.01)
*C10L 10/04*    (2006.01)

(52) U.S. Cl.
CPC ............. *C10L 1/231* (2013.01); *C10L 1/1811* (2013.01); *C10L 10/04* (2013.01); *C10L 2200/0446* (2013.01); *C10L 2270/026* (2013.01)

(58) Field of Classification Search
CPC ........ C10L 1/231; C10L 1/1811; C10L 10/04; C10L 2200/0446; C10L 2270/026; C10L 1/23; C10L 10/00
See application file for complete search history.

(56) References Cited

U.S. PATENT DOCUMENTS 2,093,008 A * 9/1937 Egerton ................. C10L 1/1811
                                                 123/1 R
2,280,217 A * 4/1942 Cloud ....................... C10L 1/22
                                                  44/325

(Continued)

FOREIGN PATENT DOCUMENTS

CN      103421553 A     12/2013
EP       0565285 A1     10/1993

(Continued)

OTHER PUBLICATIONS

International Search Report (ISR) for PCT/GB2022/052424 mailed Mar. 9, 2023 (3 pages).

(Continued)

*Primary Examiner* — Cephia D Toomer
(74) *Attorney, Agent, or Firm* — Jason A. Smith; Shumaker, Loop & Kendrick, LLP

(57) ABSTRACT

The use of a nitrate compound and/or a peroxide compound as an additive in a diesel fuel composition to reduce the impact of deposits in the post combustion system of a diesel engine when combusting said diesel fuel composition.

24 Claims, 1 Drawing Sheet

(56) References Cited

U.S. PATENT DOCUMENTS

| | | | | |
|---|---|---|---|---|
| 2,378,341 | A * | 6/1945 | Vaughan | C10L 1/18 44/322 |
| 2,655,440 | A * | 10/1953 | Barusch | C10L 1/143 44/322 |
| 4,185,594 | A * | 1/1980 | Perilstein | C10L 10/08 44/326 |
| 4,248,182 | A * | 2/1981 | Malec | C10L 1/18 44/326 |
| 4,553,979 | A * | 11/1985 | Hanlon | C10L 1/22 44/325 |
| 5,925,151 | A | 7/1999 | DeCanio et al. | |
| 2008/0052985 | A1 | 3/2008 | Stevenson et al. | |
| 2008/0060259 | A1 | 3/2008 | Breakspear et al. | |
| 2008/0060608 | A1 | 3/2008 | Breakspear et al. | |
| 2008/0113890 | A1 | 5/2008 | Moreton et al. | |
| 2008/0307698 | A1 | 12/2008 | Barton et al. | |
| 2009/0282731 | A1 | 11/2009 | Malfer et al. | |
| 2009/0320354 | A1 | 12/2009 | Kormann et al. | |
| 2011/0099979 | A1 | 5/2011 | Xu et al. | |
| 2011/0107658 | A1 | 5/2011 | Regrut | |
| 2011/0258917 | A1 | 10/2011 | Garcia Castro et al. | |
| 2011/0315107 | A1 | 12/2011 | Grabarse et al. | |
| 2012/0010112 | A1 | 1/2012 | Grabarse et al. | |
| 2013/0031827 | A1 | 2/2013 | Reid et al. | |
| 2014/0015033 | A1 | 1/2014 | Yaegashi | |
| 2022/0025286 | A1 * | 1/2022 | Clayton | C10L 1/1811 |

FOREIGN PATENT DOCUMENTS

| | | | | |
|---|---|---|---|---|
| EP | 1884556 | A2 | 2/2008 | |
| EP | 1900795 | A1 | 3/2008 | |
| EP | 3088495 | A1 | 11/2016 | |
| GB | 1124611 | * | 8/1968 | |
| GB | 1124611 | A * | 8/1968 | C10L 1/106 |
| WO | 2006135881 | A2 | 12/2006 | |
| WO | 2009040583 | A1 | 4/2009 | |
| WO | 2011095819 | A1 | 8/2011 | |
| WO | 2013017889 | A1 | 2/2013 | |
| WO | 2015011506 | A1 | 1/2015 | |
| WO | 2015011507 | A1 | 1/2015 | |
| WO | 2016016641 | A1 | 2/2016 | |
| WO | 2017017454 | A1 | 2/2017 | |
| WO | 2017203003 | A1 | 11/2017 | |
| WO | 2020120416 | A1 | 6/2020 | |

OTHER PUBLICATIONS

Written Opinion (WO) for PPCT/GB2022/052424 mailed Mar. 9, 2023 (5 pages).

* cited by examiner

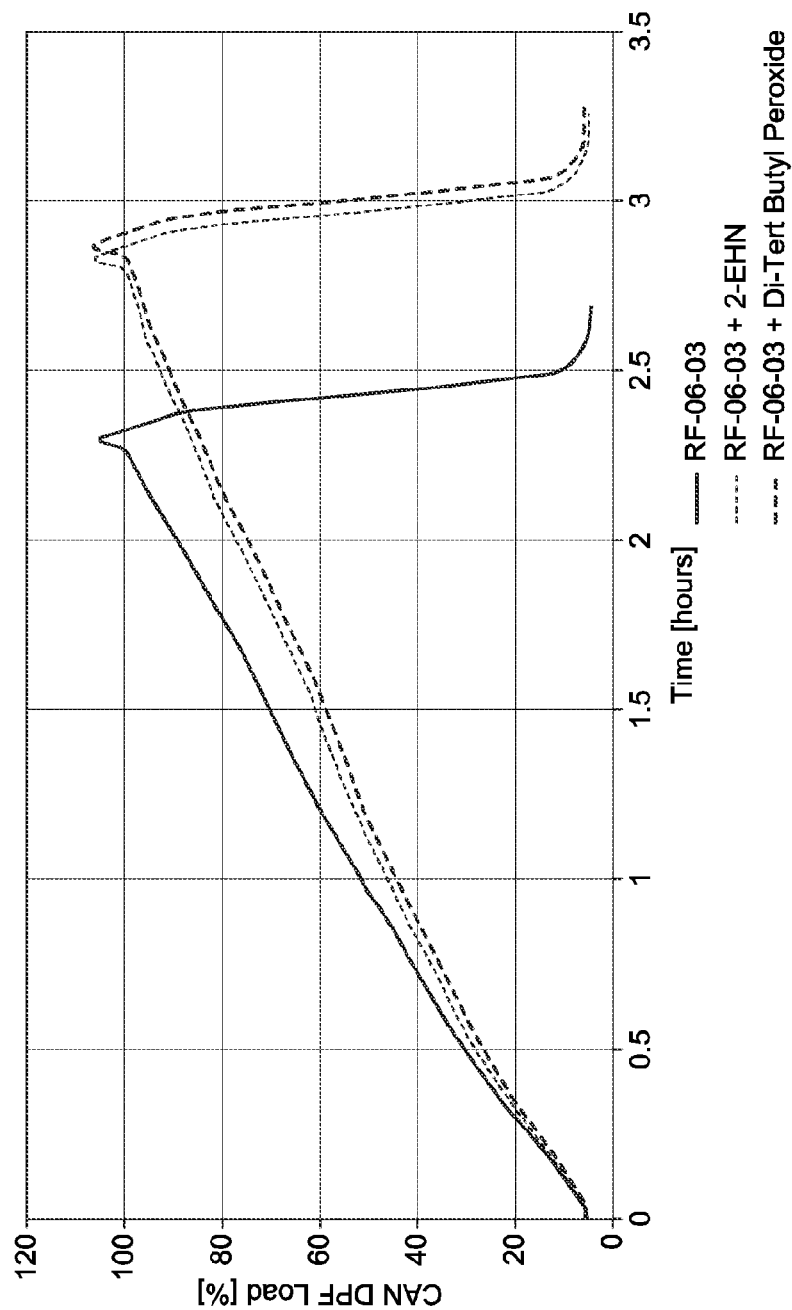

USE OF ORGANIC NITRATE AND/OR PEROXIDE ADDITIVES AND METHOD BASED THEREON FOR DEPOSIT REDUCTION IN POST DIESEL-COMBUSTION SYSTEMS

TECHNICAL FIELD AND BACKGROUND

The present invention relates to methods and uses for improving the performance of diesel engines. In particular the invention relates to reducing the impact of deposits in the post combustion system of diesel engines, especially modern diesel engines having a high pressure fuel system.

The addition of detergent additives to combat deposits in the combustion system of diesel engines, for example in the fuel injection system, is well known and a wide variety of detergents have been developed for this purpose.

There have also been attempts to reduce deposits in the exhaust gas recirculation system. However less work has been carried out to combat deposits in the post combustion system. Nevertheless, the presence of deposits in the post combustion system of a diesel engine can have a significant deleterious effect on the performance of diesel engines, especially modern diesel engines having a high pressure fuel system.

The post combustion system of a diesel engine typically includes a series of components through which exhaust gases must flow before exiting the vehicle. The post combustion system may include a turbocharger, a diesel oxidation catalyst, a diesel particulate filter, a selective catalytic reduction unit and an ammonia oxidation catalyst. It would be desirable to combat deposits in any or all of these components.

It would also be beneficial to prevent and/or to remove deposits on sensors within the post combustion system, for example deposits on NOx sensors, temperature sensors and/or pressure sensors.

SUMMARY

The present inventors have surprisingly found that the inclusion of certain compounds as fuel additives is able to combat the effect of deposits in the post combustion system.

BRIEF DESCRIPTION OF THE DRAWINGS

FIG. 1 depicts a graph corresponding to the results in Table of the additives used and test results achieved.

DETAILED DESCRIPTION

According to a first aspect of the present invention there is provided the use of a nitrate compound and/or a peroxide compound as an additive in a diesel fuel composition to reduce the impact of deposits in the post combustion system of a diesel engine when combusting said diesel fuel composition.

According to a second aspect of the present invention there is provided a method of reducing the impact of deposits in the post combustion system of a diesel engine, the method comprising combusting in the engine a diesel fuel composition comprising as an additive a nitrate compound and/or a peroxide compound.

The present invention relates to a method and use which reduces the impact of deposits in the post combustion system. The presence of deposits on one or more parts of the post combustion system of a diesel engine typically has a negative effect on the performance of the engine. Reducing the impact of deposits may involve reducing or preventing the formation of deposits and/or removing existing deposits and/or changing the nature of the deposits.

In some embodiments reducing the impact of deposits may involve changing the nature of deposits. This means that the structure or composition of deposits which are formed is different in a way that is less detrimental to the performance of the engine, for example by increasing the combustibility and/or thermal conductivity of the deposits.

In preferred embodiments reducing the impact of deposits involves reducing and/or preventing the formation of deposits and/or the removal of existing deposits.

In preferred embodiments reducing the impact of despots involves reducing and/or preventing the formation of deposits in the post combustion system of a diesel engine.

Thus the first aspect of the present invention preferably provides the use of a nitrate compound and/or a peroxide compound as an additive in a diesel fuel composition to reduce the formation of deposits in the post combustion system of a diesel engine when combusting said diesel fuel composition.

The second aspect of the present invention preferably provides a method of reducing the formation deposits in the post combustion system of a diesel engine, the method comprising combusting in the engine a diesel fuel composition comprising as an additive a nitrate compound and/or a peroxide compound.

Preferred features of the first and second aspects of the invention will now be described.

The present invention relates to the use of an additive in a diesel fuel composition to reduce the impact of deposits in the post combustion system. The additive is selected from nitrate compounds, peroxide compounds and mixtures thereof. This additive may be referred to herein as a post combustion deposit control additive.

For the avoidance of doubt the post combustion deposit control additive used in the present invention may comprise a mixture of compounds and references to an additive or the additive include mixtures, unless otherwise stated. In particular mixtures of isomers and mixtures of homologues are within the scope of the invention. The skilled person will appreciate that commercial sources of some of the additive compounds described herein may comprise mixtures of isomers and/or mixtures of homologues.

Suitable nitrate compounds may include one or more nitrate groups.

Suitable nitrate compounds include compounds of formula (I):

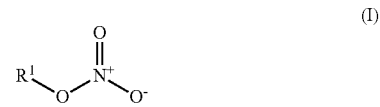

wherein $R^1$ is an optionally substituted alkyl, aryl or aralkyl group.

$R^1$ is an optionally substituted alkyl, aryl or aralkyl group. Substituents may be within the alkyl chain or aromatic ring of these groups. In some embodiments $R^1$ may be a heterocyclic group. Suitably heterocyclic groups include aromatic and aliphatic heterocyclic groups. Such heterocyclic moieties may include one or more heteroatoms. These may be suitably selected from one or more of nitrogen, sulfur and oxygen.

Preferably $R^1$ is an optionally substituted alkyl group having 1 to 36 carbon atoms, preferably 2 to 24 carbon atoms, for example 4 to 16 carbon atoms or 6 to 12 carbon atoms. In especially preferably embodiments $R^1$ has 8 to 10 carbon atoms.

Preferably $R^1$ is an unsubstituted alkyl group.

$R^1$ may be straight chain, branched or cyclic.

In preferred embodiments $R^1$ is an unsubstituted alkyl group having 1 to 36 carbon atoms, preferably 2 to 30 carbon atoms, suitably 2 to 20 carbon atoms, more preferably 4 to 16 carbon atoms, suitably 4 to 12 carbon atoms, for example 6 to 10 carbon atoms.

In some preferred embodiments $R^1$ is an unsubstituted branched, unbranched or cyclic alkyl group having 8 to 12 carbons atoms.

More preferably $R^1$ is an unsubstituted branched alkyl group having 4 to 16, preferably 6 to 12, more preferably 6 to 10 carbon atoms.

In some preferred embodiments $R^1$ is an alkyl group having 8 to 10 carbon atoms, suitably a branched or unbranched alkyl group having 8 to 10 carbon atoms, preferably a branched alkyl group having 8 to 10 carbon atoms.

Suitable compounds of formula (I) having 10 carbon atoms are described in US2009/320354 and include 2-n-propylheptyl nitrate, 2-isopropylheptyl nitrate, 2-n-propyl-4-methylhexyl nitrate, 2-isopropyl-4-methylhexyl nitrate, 2-n-propyl-5-methylhexyl nitrate, 2-isopropyl-5-methylhexyl nitrate, 2-n-propyl-4,4-dimethylpentyl nitrate and 2-isopropyl-4,4-dimethylpentyl nitrate.

Other suitable compounds of formula (I) for use herein include n-decyl nitrate, n-dodecyl nitrate and cyclohexyl nitrate.

In one especially preferred embodiments $R^1$ is 2-ethyl hexyl.

One especially preferred alkyl nitrate for use herein is 2-ethyl hexyl nitrate, the compound of formula (IA):

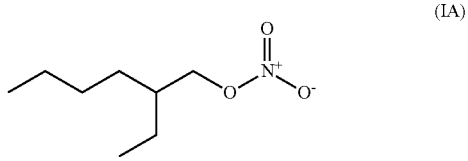

(IA)

In further especially preferred embodiments $R^1$ is a branched decyl group. Preferably the branched decyl group includes at least one methyl branch. Preferably the average degree of branding is from 0.5 to 3, for example from 1 to 2.5.

Such compounds are typically available commercially as a mixture of isomers, commonly referred to as isodecyl nitrate. A number of isomers may also be present in commercial sources, along with small amounts of other homologues.

In some embodiments the additive used in the present invention comprises a peroxide compound.

Suitable peroxide compounds for use herein include any compound including an oxygen-oxygen bond. In some embodiments the peroxide compound may include more than one oxygen-oxygen bond.

Suitable peroxide compounds are described, for example, in US2014/150333 A1 and US2011/099979.

Suitable peroxide compounds for use herein include diacetyl peroxides, peroxy esters, peroxydicarbonates, dialkyl peroxides, ketone peroxides, peroxy ketals and hydroperoxides.

Suitable peroxide compounds are available, for example, under the Luperox® tradename.

Some preferred peroxide compounds for use herein include compounds of formula (II):

(II)

wherein $R^2$ is an optionally substituted alkyl, aryl, alkaryl, aralkyl or acyl group; and $R^3$ is hydrogen or an optionally substituted alkyl, aryl, alkaryl, aralkyl or acyl group.

In some embodiments $R^3$ is hydrogen and the compound of formula (II) is a hydroperoxide.

Preferred hydroperoxides include tert-butyl hydroperoxide and cumene hydroperoxide.

Preferably each of each of $R^2$ and $R^3$ is independently an optionally substituted alkyl or acyl group.

$R^2$ and $R^3$ may be the same or different.

Preferably each of $R^2$ and $R^3$ is independently an optionally substituted alkyl, aryl, alkaryl, aralkyl or acyl group having 1 to 36 carbon atoms, preferably 1 to 24 carbon atoms, preferably 1 to 16 carbon atoms, more preferably 2 to 10 carbon atoms, for example 2 to 6 carbon atoms.

Preferably each of $R^2$ and $R^3$ is independently an optionally substituted alkyl or acyl group having 1 to 36 carbon atoms, preferably 1 to 24 carbon atoms, preferably 1 to 16 carbon atoms, more preferably 2 to 10 carbon atoms, for example 2 to 6 carbon atoms.

Preferably each of $R^2$ and $R^3$ is independently an optionally substituted alkyl group having 1 to 36 carbon atoms, preferably 1 to 24 carbon atoms, preferably 1 to 16 carbon atoms, more preferably 2 to 10 carbon atoms, for example 2 to 6 carbon atoms.

Preferably each of $R^2$ and $R^3$ is selected from tert-butyl, tert-amyl and cumyl.

Preferably $R^2$ is the same as $R^3$.

Preferably each of $R^2$ and $R^3$ is an unsubstituted alkyl group.

Each of $R^2$ and $R^3$ may be straight chain, branched or cyclic.

Preferably each of $R^2$ and $R^3$ is an unsubstituted alkyl group having 1 to 36 carbon atoms, preferably 1 to 30 carbon atoms, suitably 1 to 24 carbon atoms, preferably 1 to 18 carbon atoms, more preferably 1 to 12 carbon atoms, suitably 2 to 8 carbon atoms, more preferably 2 to 6 carbon atoms or 3 to 6 carbon atoms.

More preferably each of $R^2$ and $R^3$ is an unsubstituted branched alkyl group having 3 to 12 carbon atoms, preferably 3 to 8 carbon atoms, suitably 3 to 5 carbon atoms.

Most preferably $R^2$ is tert-butyl and $R^3$ is tert-butyl.

In some embodiments the peroxide compound may include two or more oxygen-oxygen bonds. For example the peroxide compound may comprise a compound of formula (III):

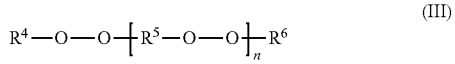

(III)

wherein each of $R^4$ and $R^6$ is independently an optionally substituted alkyl, aryl, alkaryl, aralkyl or acyl group, each $R^5$ is independently an optionally substituted alkylene, arylene, alkarylene or aralkylene group, and n is at least 1.

Preferably n is 1 or 2. Most preferably n is 1.

Preferably each of $R^4$ and $R^6$ is independently an optionally substituted alkyl, aryl, alkaryl, aralkyl or acyl group having 1 to 36 carbon atoms, preferably 1 to 24 carbon atoms, preferably 1 to 16 carbon atoms, more preferably 2 to 10 carbon atoms, for example 2 to 6 carbon atoms.

Preferably $R^5$ is an optionally substituted alkylene, arylene, alkarylene or aralkylene group having 1 to 36 carbon atoms, preferably 1 to 24 carbon atoms, preferably 1 to 16 carbon atoms, more preferably 2 to 10 carbon atoms, for example 2 to 6 carbon atoms.

One example of such a compound is 2,5-dimethyl-2,5-di(tert-butylperoxy)hexane, shown in figure (IIIA):

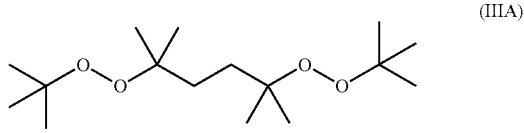 [SMILES: CC(C)(C)OOC(C)(C)CCC(C)(C)OOC(C)(C)C]

(IIIA)

In some embodiments, the peroxide compound may be a cyclic compound comprising more than one oxygen-oxygen bond. One example of such a compound is 3,6,9-triethyl-3,6,9-trimethyl-1,4,7-triperoxonane, shown in figure (IV):

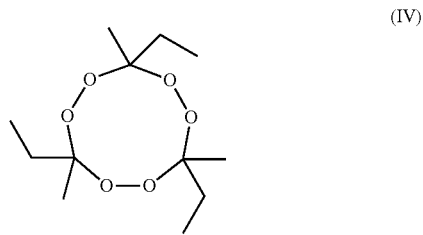 [SMILES: CCC1(C)OOC(C)(CC)OOC(C)(CC)OO1]

(IV)

Suitable peroxide compounds for use herein include alkyl peroxides, aryl peroxides, alkyl aryl peroxides, acyl peroxides, peroxy esters, peroxy ketones, per acids, hydroperoxides, and mixtures thereof. Specific examples of suitable peroxide compounds include di-tert-butyl peroxide, cumyl peroxide, 2,5-dimethyl-2,5-di(tert-butylperoxy) hexane, tert-butyl cumyl peroxide, benzoyl peroxide, tert-butyl peracetate, 3,6,9-triethyl-3,9-trimethyl-1,4,7-triperoxononan, peroxy acetic, and tert-butyl hydroperoxide, cumene hydroperoxide, cyclohexyl hydroperoxide and dicyclohexyl hydroperoxide.

One especially preferred dialkyl peroxide for use herein is di-tert-butyl peroxide, the compound of formula (IIA):

(IIA)

The additive is used in a diesel fuel composition.

In some embodiments the diesel fuel composition may comprise a nitrate additive.

In some embodiments the diesel fuel composition may comprise a peroxide additive.

In some embodiments the diesel fuel composition may comprise a nitrate additive and a peroxide additive.

In some embodiments the diesel fuel composition may comprise one or more nitrate additives and/or one or more peroxide additives.

Suitably the diesel fuel composition comprises one or more alkyl nitrate additives and/or one or more dialkyl peroxide additives.

Preferably the post combustion deposit control additive is selected from 2-ethylhexyl nitrate, a decyl nitrate, di-tert-butyl peroxide and mixtures thereof.

Preferred decyl nitrates include a branched decyl group as previously described herein.

Preferably the post combustion deposit control additive comprises 2-ethylhexyl nitrate.

Suitably the post combustion deposit control additive is present in the diesel fuel composition in an amount of at least 1 ppm, preferably at least 10 ppm, more preferably at least 20 ppm, suitably at least 30 ppm, preferably at least 40 ppm, for example at least 50 ppm or at least 60 ppm.

Suitably the post combustion deposit control additive is present in the diesel fuel composition in an amount of up to 20000 ppm, suitably up to 10000 ppm, preferably up to 9000 ppm, suitably up to 8000 ppm, for example up to 7000 ppm.

In some preferred embodiments the post combustion deposit control additive is present in the diesel fuel composition in an amount of less than 1000 ppm, preferably less than 700 ppm, more preferably less than 500 ppm, suitably less than 400 ppm, for example less than 350 ppm or less than 300 ppm.

In some embodiments the post combustion deposit control additive is present in the diesel fuel composition in an amount of from 50 to 6000 ppm.

In some embodiments the post combustion deposit control additive is present in the diesel fuel composition in an amount of from 50 to 3000 ppm, more preferably from 50 to 2000 ppm.

In some embodiments the post combustion deposit control additive is present in the diesel fuel composition in an amount of from 50 to 750 ppm.

Preferably the post combustion deposit control additive is present in the diesel fuel composition in an amount of from 50 to 350 ppm.

In some especially preferred embodiments the post combustion deposit control additive is present in the diesel fuel composition in an amount of from 50 to 300 ppm.

In some especially preferred embodiments the post combustion deposit control additive is present in the diesel fuel composition in an amount of from 500 to 1000 ppm.

In this specification any reference to ppm is to parts per million by weight.

The diesel fuel compositions used in the present invention may comprise a mixture of two or more post combustion deposit control additives. In such embodiments the above amounts refer to the total amounts of all such additives present in the composition.

The post combustion deposit control additive may be added to diesel fuel at any convenient place in the supply chain. For example, the additive may be added to fuel at the refinery, at a distribution terminal or after the fuel has left the distribution terminal. If the additive is added to the fuel after it has left the distribution terminal, this is termed an aftermarket application. Aftermarket applications include such circumstances as adding the additive to the fuel in the delivery tanker, directly to a customer's bulk storage tank, or directly to the end user's vehicle tank. Aftermarket applications may include supplying the fuel additive in small bottles suitable for direct addition to fuel storage tanks or vehicle tanks.

By diesel fuel we include any fuel suitable for use in a diesel engine either for road use or non-road use. This includes but is not limited to fuels described as diesel, marine diesel, heavy fuel oil, industrial fuel oil, etc.

The diesel fuel composition used in the present invention may comprise a petroleum-based fuel oil, especially a middle distillate fuel oil. Such distillate fuel oils generally boil within the range of from 110° C. to 500° C., e.g. 150° C. to 400° C. The diesel fuel may comprise atmospheric distillate or vacuum distillate, cracked gas oil, or a blend in any proportion of straight run and refinery streams such as thermally and/or catalytically cracked and hydro-cracked distillates.

The diesel fuel composition may comprise non-renewable Fischer-Tropsch fuels such as those described as GTL (gas-to-liquid) fuels, CTL (coal-to-liquid) fuels and OTL (oil sands-to-liquid).

The diesel fuel composition may comprise a renewable fuel such as a biofuel composition or biodiesel composition.

The diesel fuel composition may comprise 1st generation biodiesel. First generation biodiesel contains esters of, for example, vegetable oils, animal fats and used cooking fats or oils. This form of biodiesel may be obtained by transesterification of oils, for example rapeseed oil, soybean oil, canola oil, safflower oil, palm oil, corn oil, peanut oil, cotton seed oil, tallow, coconut oil, physic nut oil (Jatropha), sunflower seed oil, used cooking oils, hydrogenated vegetable oils or any mixture thereof, with an alcohol, usually a monoalcohol, usually in the presence of a catalyst.

The diesel fuel composition may comprise second generation biodiesel. Second generation biodiesel is derived from renewable resources such as vegetable oils and animal fats and processed, often in the refinery, using, for example, hydroprocessing such as the H-Bio process developed by Petrobras. Second generation biodiesel may be similar in properties and quality to petroleum based fuel oil streams, for example renewable diesel produced from vegetable oils, animal fats etc. and marketed by ConocoPhillips as Renewable Diesel and by Neste as NExBTL.

The diesel fuel composition may comprise third generation biodiesel. Third generation biodiesel utilises gasification and Fischer-Tropsch technology including those described as BTL (biomass-to-liquid) fuels. Third generation biodiesel does not differ widely from some second generation biodiesel, but aims to exploit the whole plant (biomass) and thereby widens the feedstock base.

In some embodiments the diesel fuel composition may comprise a pyrolysis oil, for example a plastic pyrolysis oil or a biomass (wood, vegetable oil, algae) pyrolysis oil.

The diesel fuel composition may contain blends of any or all of the above diesel fuel compositions.

In some embodiments the diesel fuel composition may be a blended diesel fuel comprising bio-diesel. In such blends the bio-diesel may be present in an amount of, for example up to 0.5%, up to 1%, up to 2%, up to 3%, up to 4%, up to 5%, up to 10%, up to 20%, up to 30%, up to 40%, up to 50%, up to 60%, up to 70%, up to 80%, up to 90%, up to 95% or up to 99%.

In some embodiments the fuel composition may comprise neat biodiesel.

In some preferred embodiments the fuel composition comprises at least 5 wt % biodiesel.

In some embodiments the fuel composition may comprise GTL fuel or be a neat GTL fuel.

In some embodiments the diesel fuel composition may comprise a secondary fuel, for example ethanol. Preferably however the diesel fuel composition does not contain ethanol.

The diesel fuel composition used in the present invention may contain a relatively high sulphur content, for example greater than 0.05% by weight, such as 0.1% or 0.2%.

However, in preferred embodiments the diesel fuel composition has a sulphur content of at most 0.05% by weight, more preferably of at most 0.035% by weight, especially of at most 0.015%. Fuels with even lower levels of sulphur are also suitable such as, fuels with less than 50 ppm sulphur by weight, preferably less than 20 ppm, for example 10 ppm or less.

The diesel fuel composition used in the present invention preferably comprises at least 5 wt % biodiesel and less than 50 ppm sulphur.

Various metal species may be present in the diesel fuel composition. This may be due to contamination of the fuel during manufacture, storage, transport or use or due to contamination of fuel additives. Metal species may also be added to fuels deliberately. For example, transition metals are sometimes added as fuel borne catalysts, for example to improve the performance of diesel particulate filters.

Other metal-containing species may also be present as a contaminant, for example through the corrosion of metal and metal oxide surfaces by acidic species present in the fuel or from lubricating oil. In use, fuels such as diesel fuels routinely come into contact with metal surfaces for example, in vehicle fueling systems, fuel tanks, fuel transportation means etc. Typically, metal-containing contamination may comprise transition metals such as zinc, iron and copper; Group I or Group II metals and other metals such as lead.

In addition to metal-containing contamination which may be present in diesel fuels there are circumstances where metal-containing species may deliberately be added to the fuel. For example, as is known in the art, metal-containing fuel-borne catalyst species may be added to aid with the regeneration of particulate traps. The presence of such catalysts may also give rise to injector deposits when the fuels are used in diesel engines having high pressure fuel systems.

Metal-containing contamination, depending on its source, may be in the form of insoluble particulates or soluble compounds or complexes. Metal-containing fuel-borne catalysts are often soluble compounds or complexes or colloidal species.

In some embodiments, the diesel fuel may comprise metal-containing species comprising a fuel-borne catalyst. Preferably, the fuel borne catalyst comprises one or more metals selected from iron, cerium, platinum, manganese, Group I and Group II metals e.g., calcium and strontium. Most preferably the fuel borne catalyst comprises a metal selected from iron and cerium.

Typically, the total amount of all metal-containing species in the diesel fuel, expressed in terms of the total weight of metal in the species, is between 0.1 and 50 ppm by weight, for example between 0.1 and 20 ppm, preferably between 0.1 and 10 ppm by weight, based on the weight of the diesel fuel.

The diesel fuel compositions used in the present invention may include one or more further additives such as those which are commonly found in diesel fuels. These include, for example, antioxidants, dispersants, detergents, metal deactivating compounds, wax anti-settling agents, cold flow improvers, cetane improvers, dehazers, stabilisers, demulsifiers, antifoams, corrosion inhibitors, lubricity improvers, dyes, markers, combustion improvers, metal deactivators, odour masks, drag reducers and conductivity improvers. Examples of suitable amounts of each of these types of additives will be known to the person skilled in the art.

In some preferred embodiments the diesel fuel composition of the present invention comprises one or more detergents. Nitrogen-containing detergents are preferred.

The one or more detergents may be selected from:
(i) a quaternary ammonium salt additive;
(ii) the product of a Mannich reaction between an aldehyde, an amine and an optionally substituted phenol;
(iii) the reaction product of a carboxylic acid-derived acylating agent and an amine;
(iv) the reaction product of a carboxylic acid-derived acylating agent and hydrazine;
(v) a salt formed by the reaction of a carboxylic acid with di-n-butylamine or tri-n-butylamine;
(vi) the reaction product of a hydrocarbyl-substituted dicarboxylic acid or anhydride and an amine compound or salt which product comprises at least one amino triazole group; and
(vii) a substituted polyaromatic detergent additive.

Preferably one or more detergents are selected from one or more of:
(i) a quaternary ammonium salt additive;
(ii) the product of a Mannich reaction between an aldehyde, an amine and an optionally substituted phenol; and
(iii) the reaction product of a carboxylic acid-derived acylating agent and an amine.

The ratio of the post combustion deposit control additive to the nitrogen containing detergent is suitably from 9:1 to 1:9, preferably from 5:1 to 1:5, preferably from 2:1 to 1:2.

In some embodiments the diesel fuel composition further comprises (i) a quaternary ammonium salt additive.

The quaternary ammonium salt additive is suitably the reaction product of a nitrogen-containing species having at least one tertiary amine group and a quaternising agent.

The nitrogen containing species may be selected from:
(x) the reaction product of a hydrocarbyl-substituted acylating agent and a compound comprising at least one tertiary amine group and a primary amine, secondary amine or alcohol group;
(y) a Mannich reaction product comprising a tertiary amine group; and
(z) a polyalkylene substituted amine having at least one tertiary amine group.

Examples of quaternary ammonium salt and methods for preparing the same are described in the following patents, which are hereby incorporated by reference, US2008/0307698, US2008/0052985, US2008/0113890 and US2013/031827.

The preparation of some suitable quaternary ammonium salt additives in which the nitrogen-containing species includes component (x) is described in WO 2006/135881 and WO2011/095819.

Component (y) is a Mannich reaction product having a tertiary amine. The preparation of quaternary ammonium salts formed from nitrogen-containing species including component (y) is described in US 2008/0052985.

The preparation of quaternary ammonium salt additives in which the nitrogen-containing species includes component (z) is described for example in US 2008/0113890.

To form the quaternary ammonium salt additive (i) the nitrogen-containing species having a tertiary amine group is reacted with a quaternising agent.

The quaternising agent may suitably be selected from esters and non-esters.

Preferred quaternising agents for use herein include dimethyl oxalate, methyl 2-nitrobenzoate, methyl salicylate and styrene oxide or propylene oxide optionally in combination with an additional acid.

An especially preferred additional quaternary ammonium salt for use herein is formed by reacting methyl salicylate or dimethyl oxalate with the reaction product of a polyisobutylene-substituted succinic anhydride having a PIB number average molecular weight of 700 to 1300 and dimethylaminopropylamine.

Other suitable quaternary ammonium salts include quaternised terpolymers, for example as described in US2011/0258917; quaternised copolymers, for example as described in US2011/0315107; and the acid-free quaternised nitrogen compounds disclosed in US2012/0010112.

Further suitable quaternary ammonium compounds for use in the present invention include the quaternary ammonium compounds described in the applicants copending applications WO2011095819, WO2013/017889, WO2015/011506, WO2015/011507, WO2016/016641 and PCT/GB2016/052312.

In some embodiments the diesel fuel composition used in the present invention comprises from 1 to 500 ppm, preferably 50 to 250 ppm of the quaternary ammonium salt additive (i).

In some embodiments the diesel fuel composition further comprises (ii) the product of a Mannich reaction between an aldehyde, an amine and an optionally substituted phenol. This Mannich reaction product is suitably not a quaternary ammonium salt.

Preferably the aldehyde component used to prepare the Mannich additive is an aliphatic aldehyde. Preferably the aldehyde has 1 to 10 carbon atoms. Most preferably the aldehyde is formaldehyde.

Suitable amines for use in preparing the Mannich additive include monoamines and polyamines. One suitable monoamine is butylamine.

The amine used to prepare the Mannich additive is preferably a polyamine. This may be selected from any compound including two or more amine groups. Preferably the polyamine is a polyalkylene polyamine, preferably a polyethylene polyamine. Most preferably the polyamine comprises tetraethylenepentamine or ethylenediamine.

The optionally substituted phenol component used to prepare the Mannich additive may be substituted with 0 to 4 groups on the aromatic ring (in addition to the phenol OH). For example it may be a hydrocarbyl-substituted cresol. Most preferably the phenol component is a mono-substituted phenol. Preferably it is a hydrocarbyl substituted phenol. Preferred hydrocarbyl substituents are alkyl substituents having 4 to 28 carbon atoms, especially 10 to 14 carbon atoms. Other preferred hydrocarbyl substituents are polyalkenyl substituents. Such polyisobutenyl substituents having a number average molecular weight of from 400 to 2500, for example from 500 to 1500.

In some embodiments the diesel fuel composition of the present invention comprises from 1 to 500 ppm, preferably 50 to 250 ppm of a Mannich additive (ii).

In some embodiments the diesel fuel composition further comprises (iii) the reaction product of a carboxylic acid-derived acylating agent and an amine.

These may also be referred to herein in general as acylated nitrogen-containing compounds.

Suitable acylated nitrogen-containing compounds may be made by reacting a carboxylic acid acylating agent with an amine and are known to those skilled in the art.

Preferred hydrocarbyl substituted acylating agents are polyisobutenyl succinic anhydrides. These compounds are commonly referred to as "PIBSAs" and are known to the person skilled in the art.

Conventional polyisobutenes and so-called "highly-reactive" polyisobutenes are suitable for use in the invention.

Especially preferred PIBSAs are those having a PIB molecular weight (Mn) of from 300 to 2800, preferably from 450 to 2300, more preferably from 500 to 1300.

In preferred embodiments the reaction product of the carboxylic acid derived acylating agent and an amine includes at least one primary or secondary amine group.

A preferred acylated nitrogen-containing compound for use herein is prepared by reacting a poly(isobutene)-substituted succinic acid-derived acylating agent (e.g., anhydride, acid, ester, etc.) wherein the poly(isobutene) substituent has a number average molecular weight (Mn) of between 170 to 2800 with a mixture of ethylene polyamines having 2 to about 9 amino nitrogen atoms, preferably about 2 to about 8 nitrogen atoms, per ethylene polyamine and about 1 to about 8 ethylene groups. These acylated nitrogen compounds are suitably formed by the reaction of a molar ratio of acylating agent:amino compound of from 10:1 to 1:10, preferably from 5:1 to 1:5, more preferably from 2:1 to 1:2 and most preferably from 2:1 to 1:1. In especially preferred embodiments, the acylated nitrogen compounds are formed by the reaction of acylating agent to amino compound in a molar ratio of from 1.8:1 to 1:1.2, preferably from 1.6:1 to 1:1.2, more preferably from 1.4:1 to 1:1.1 and most preferably from 1.2:1 to 1:1. Acylated amino compounds of this type and their preparation are well known to those skilled in the art and are described in for example EP0565285 and U.S. Pat. No. 5,925,151.

In some preferred embodiments the composition comprises a detergent of the type formed by the reaction of a polyisobutene-substituted succinic acid-derived acylating agent and a polyethylene polyamine. Suitable compounds are, for example, described in WO2009/040583.

In some embodiments the diesel fuel composition of the present invention comprises from 1 to 500 ppm, preferably 50 to 250 ppm of an additive which is the reaction product of an acylating agents and an amine (iii).

In some embodiments the diesel fuel composition comprises (iv) the reaction product of a carboxylic acid-derived acylating agent and hydrazine.

Suitably the additive comprises the reaction product between a hydrocarbyl-substituted succinic acid or anhydride and hydrazine.

Preferably, the hydrocarbyl group of the hydrocarbyl-substituted succinic acid or anhydride comprises a $C_8$-$C_{36}$ group, preferably a $C_8$-$C_{18}$ group. Alternatively, the hydrocarbyl group may be a polyisobutylene group with a number average molecular weight of between 200 and 2500, preferably between 800 and 1200.

Hydrazine has the formula $NH_2$—$NH_2$. Hydrazine may be hydrated or non-hydrated. Hydrazine monohydrate is preferred.

The reaction between the hydrocarbyl-substituted succinic acid or anhydride and hydrazine produces a variety of products, such as is disclosed in US 2008/0060259.

In some embodiments the diesel fuel composition further comprises (v) a salt formed by the reaction of a carboxylic acid with di-n-butylamine or tri-n-butylamine. Exemplary compounds of this type are described in US 2008/0060608.

Such additives may suitably be the di-n-butylamine or tri-n-butylamine salt of a fatty acid of the formula $[R'(COOH)_x]_y$, where each R' is a independently a hydrocarbon group of between 2 and 45 carbon atoms, and x is an integer between 1 and 4.

In a preferred embodiment, the carboxylic acid comprises tall oil fatty acid (TOFA).

Further preferred features of additives of this type are described in EP1900795.

In some embodiments the diesel fuel composition further comprises (vi) the reaction product of a hydrocarbyl-substituted dicarboxylic acid or anhydride and an amine compound or salt which product comprises at least one amino triazole group.

Further preferred features of additive compounds of this type are as defined in US2009/0282731.

In some embodiments the diesel fuel composition further comprises (vii) a substituted polyaromatic detergent additive.

One preferred compound of this type is the reaction product of an ethoxylated naphthol and paraformaldehyde which is then reacted with a hydrocarbyl substituted acylating agent.

Further preferred features of these detergents are described in EP1884556.

The present invention reduces the formation of deposits in the post combustion system of a diesel engine.

The diesel engine may be a direct injection diesel engine or an indirect injection diesel engine.

In some embodiments the engine may be an off road engine, for example a marine, rail or stationary engine. Stationary engines include engines for power generation and pumping.

Most preferably the engine is a direct injection diesel engine.

The post combustion deposit control additives used in the present invention have been found to be particularly effective in modern diesel engines having a high pressure fuel system.

Suitably the present invention may be used to reduce the formation or deposits in the post combustion system of a diesel engine having a high pressure fuel system. Suitably the diesel engine has a fuel pressure in excess of 1350 bar ($1.35 \times 10^8$ Pa). It may have a pressure of up to 2000 bar ($2 \times 10^8$ Pa) or more.

Such diesel engines may be characterised in a number of ways.

Such engines are typically equipped with fuel injection equipment meeting or exceeding "Euro 5" emissions legislation or equivalent legislation in the US or other countries.

Such engines are typically equipped with fuel injectors having a plurality of apertures, each aperture having an inlet and an outlet.

Such engines may be characterised by apertures which are tapered such that the inlet diameter of the spray-holes is greater than the outlet diameter.

Such modern engines may be characterised by apertures having an outlet diameter of less than 500 µm, preferably less than 200 µm, more preferably less than 150 µm, preferably less than 100 µm, most preferably less than 80 µm or less.

Such modern diesel engines may be characterised by apertures where an inner edge of the inlet is rounded.

Such modern diesel engines may be characterised by the injector having more than one aperture, suitably more than 2 apertures, preferably more than 4 apertures, for example 6 or more apertures.

Such modern diesel engines may be characterised by an operating tip temperature in excess of 250° C.

Such modern diesel engines may be characterised by a fuel injection system which provides a fuel pressure of more than 1350 bar, preferably more than 1500 bar, more preferably more than 2000 bar.

Two non-limiting examples of such high pressure fuel systems are: the common rail injection system, in which the fuel is compressed utilizing a high-pressure pump that supplies it to the fuel injection valves through a common rail; and the unit injection system which integrates the high-pressure pump and fuel injection valve in one assembly, achieving the highest possible injection pressures exceeding 2000 bar ($2 \times 10^8$ Pa). In both systems, in pressurising the fuel, the fuel gets hot, often to temperatures around 100° C., or above.

Preferably, the diesel engine has fuel injection system which comprises a common rail injection system.

In common rail systems, the fuel is stored at high pressure in the central accumulator rail or separate accumulators prior to being delivered to the injectors. Often, some of the heated fuel is returned to the low pressure side of the fuel system or returned to the fuel tank. In unit injection systems the fuel is compressed within the injector in order to generate the high injection pressures. This in turn increases the temperature of the fuel.

In both systems, fuel is present in the injector body prior to injection where it is heated further due to heat from the combustion chamber. The temperature of the fuel at the tip of the injector can be as high as 250-350° C.

Thus the fuel is stressed at pressures from 1350 bar ($1.35 \times 10^8$ Pa) to over 2000 bar ($2 \times 10^8$ Pa) and temperatures from around 100° C. to 350° C. prior to injection, sometimes being recirculated back within the fuel system thus increasing the time for which the fuel experiences these conditions.

The post combustion system of diesel engines is provided to reduce the emission of pollutants such as particulates and harmful gases into the environment. The formation of deposits on parts of the post combustion system can reduce the efficiency of the system and lead to an increase in the emission of particulate deposits and/or harmful gases.

In some embodiments the impact of the deposits may be reduced by a change in the nature of deposits.

Preferably the present invention reduces the formation of deposits in the post combustion system.

By reducing the formation of deposits in a post combustion system we mean that the when a fuel comprising the post combustion deposit reducing additive is combusted in an engine, a reduced level of deposits is obtained compared to when an otherwise identical fuel is combusted under identical conditions except for the inclusion of the post combustion deposit reducing additive.

Suitably addition of nitrate compound (especially an alkyl nitrate) and/or a peroxide compound (especially a dialkyl peroxide) into the diesel fuel combusted in an engine reduces the formation of deposits in one or more components of the post combustion system by at least 0.01%, preferably by at least 0.1%, for example at least 1% or at least 2%.

In some embodiments the addition of a nitrate compound (especially an alkyl nitrate) and/or a peroxide compound (especially a dialkyl peroxide) into the diesel fuel combusted in an engine may reduce the formation deposits in one or more components of the post combustion system by at least 3%, for example at least 4% or at least 5%.

By the post combustion system of a diesel engine we mean to refer to any part of the engine through which exhaust gases pass after finally leaving the combustion system. The exhaust gas recirculation (EGR) system is not considered part of the post combustion system within the meaning of the invention since gases passing through the EGR system may renter the combustion chamber.

The post combustion system may comprise one or more components selected from a turbocharger, a diesel oxidation catalyst, a diesel particulate filter, a selective catalytic reduction unit and an ammonia oxidation unit. The post combustion system may include these components in any order and this may order vary from vehicle to vehicle. The present invention may reduce the impact of deposits in or on one or more of these components.

In some embodiments addition of a nitrate compound (especially an alkyl nitrate) and/or a peroxide compound (especially a dialkyl peroxide) into the diesel fuel combusted in an engine reduces the formation of deposits in the turbocharger, suitably by at least 0.01%, preferably by at least 0.1%, for example at least 1% or at least 2%.

The present invention may reduce deposits on a fixed geometry turbocharger or on a variable geometry turbocharger. Variable geometry turbochargers having moving parts which are controlled by the engine management system. This allows the aspect ratio of the turbocharger to be changed to optimise performance at different speeds. The formation of deposits can lead to parts sticking. As a result the turbocharger will not provide the correct level of boost and may ultimately fail. The reduction of deposits on the turbocharger is therefore highly beneficial.

Preferably the present invention reduces deposits on the turbine wheel of the turbocharger.

In some embodiments the addition of a nitrate compound (especially an alkyl nitrate) and/or a peroxide compound (especially a dialkyl peroxide) into the diesel fuel combusted in an engine may reduce the formation deposits in the turbocharger by at least 3%, for example at least 4% or at least 5%.

In some embodiments addition of a nitrate compound (especially an alkyl nitrate) and/or a peroxide compound (especially a dialkyl peroxide) into the diesel fuel combusted in an engine reduces the formation of deposits in the diesel oxidation catalyst, suitably by at least 0.01%, preferably by at least 0.1%, for example at least 1% or at least 2%.

The diesel oxidation catalyst typically comprises a ceramic support structure coated with metals such as palladium, platinum and/or rhodium. The formation of deposits in the diesel oxidation catalyst can lead to a reduction in flow rate through the catalyst and/or poisoning of the catalyst.

In some embodiments the addition of a nitrate compound (especially an alkyl nitrate) and/or a peroxide compound (especially a dialkyl peroxide) into the diesel fuel combusted in an engine may reduce the formation deposits in the diesel oxidation catalyst by at least 3%, for example at least 4% or at least 5%.

Suitably addition of a nitrate compound (especially an alkyl nitrate) and/or a peroxide compound (especially a dialkyl peroxide) into the diesel fuel combusted in an engine reduces the formation of deposits in the diesel particulate filter, suitably by at least 0.01%, preferably by at least 0.1%, for example at least 1% or at least 2%.

The diesel particulate filter is designed to capture from the exhaust gases particulates such as soot which are formed in the combustion chamber. These particulates collect on the filter and are burnt off at intervals by the increasing temperature of the exhaust gases and the injection of additional fuel. This process is known as filter regeneration.

The present invention may increase the interval between regenerations. This can improve the fuel economy of the engine and reduce emissions. By a reduction in regenerations we mean to include a reduction in active, passive or parked regenerations of the diesel particulate filter. For example there may be a reduction in the number of regeneration events per 1000 km. In some embodiments the addition of a nitrate compound (especially an alkyl nitrate) and/or a peroxide compound (especially a dialkyl peroxide) into the diesel fuel combusted in an engine may reduce the formation deposits in the diesel particulate filter by at least 3%, for example at least 4% or at least 5%.

In some embodiments addition of a nitrate compound (especially an alkyl nitrate) and/or a peroxide compound (especially a dialkyl peroxide) into the diesel fuel combusted in an engine reduces the formation of deposits in the selective catalytic reduction unit, suitably by at least 0.01%, preferably by at least 0.1%, for example at least 1% or at least 2%.

Selective catalytic reduction is used to remove NOx and other harmful gases from the exhaust stream and involves the use of ammonia as a reductant in the presence of a catalyst. The selective catalytic reduction unit comprises a porous ceramic support and a catalyst, typically comprising a metal or a zeolite.

The formation of deposits on the selective catalytic reduction unit can lead to a reduction in flow rate through the unit and/or poisoning of the catalyst.

In some embodiments the addition of a nitrate compound (especially an alkyl nitrate) and/or a peroxide compound (especially a dialkyl peroxide) into the diesel fuel combusted in an engine may reduce the formation deposits in the selective catalytic reduction unit by at least 3%, for example at least 4% or at least 5%.

In some embodiments addition of a nitrate compound (especially an alkyl nitrate) and/or a peroxide compound (especially a dialkyl peroxide) into the diesel fuel combusted in an engine reduces the formation of deposits in the ammonia oxidation catalyst, suitably by at least 0.01%, preferably by at least 0.1%, for example at least 1% or at least 2%.

The ammonia oxidation catalyst is used to oxidise any ammonia present in the exhaust gases after passing through the selective catalytic reduction unit.

The formation of deposits on the ammonia oxidation catalyst can lead to a reduction in flow rate through the catalyst and/or poisoning of the catalyst.

In some embodiments the addition of a nitrate compound (especially an alkyl nitrate) and/or a peroxide compound (especially a dialkyl peroxide) into the diesel fuel combusted in an engine may reduce the formation deposits in the ammonia oxidation catalyst by at least 3%, for example at least 4% or at least 5%.

In some embodiments addition of a nitrate compound (especially an alkyl nitrate) and/or a peroxide compound (especially a dialkyl peroxide) into the diesel fuel combusted in an engine reduces the formation of deposits on sensors within the post combustion system, suitably by at least 0.01%, preferably by at least 0.1%, for example at least 1% or at least 2%.

Sensors may be present in the post combustion to measure temperature, pressure and/or concentrations of gases such as NOx in the exhaust gases. If deposits are present on or around the sensors they may be unable to function correctly or inaccurate measurements may be taken leading to incorrect information being provided to the engine management system. This can lead to poor performance of the engine.

In some embodiments the addition of a nitrate compound (especially an alkyl nitrate) and/or a peroxide compound (especially a dialkyl peroxide) into the diesel fuel combusted in an engine may reduce the formation deposits on sensors within the post combustion system by at least 3%, for example at least 4% or at least 5%.

The reduction in deposits in post combustion system may be measured by any suitable means.

One simple means by which the level of deposits in a part of a post combustion system may be determined is by weighing the part of the system before and after use. One or more parts of the system may be weighed.

Other less direct methods may also be used. For example an improvement in fuel economy may indicate longer regeneration intervals on a diesel particulate filter.

Preferably the present invention provides an improvement in fuel economy of at least 0.1%, preferably at least 0.5%, suitably at least 1%, for example at least 2%.

The engine management system of a vehicle may be interrogated to assess the performance of components such as the turbocharger, the diesel particulate filter, the diesel oxidation catalyst and the selective catalytic reduction unit.

The invention may result in fewer error messages being provided by the engine management system to a driver.

An increase in the necessary maintenance intervals for a catalytic components may also indicate improved performance due to deposit reduction.

The deposits that form in the post combustion system may be analysed. This may be achieved, for example by extracting the deposits or a portion thereof into a solvent. The sample may be separated into soluble and non soluble fractions; these may then be separately analysed by methods known to those skilled in the art, for example elemental analysis, thermogravimetric analysis and/or gas chromatography mass spectrometry.

Thermogravimetric analysis (or TGA) involves measuring the mass of a sample over time as it is heated. This technique is well know to the person skilled in the art and the selection of an appropriate method and suitable equipment will be within the competence of one skilled in the art.

When post composition deposits contain soot, the soot density can be measured, for example using an AVL483 microsoot sensor.

Particle size of the soot can be measured by techniques known to these skilled in the art.

The reduction of deposits in the post combustion system of a diesel engine according to the present invention offers significant benefits.

These include, but are not limited to: an increase in power generation; an increase in torque; an increase in fuel economy; a reduction in emissions; a reduction in combustion chamber deposits; an acceleration improvement; driveability improvements; a reduction in cold start issues; lower soot formation; mitigation of lubricant degradation and/or performance loss; a reduction in diesel exhaust fluid and consumption e.g. urea consumption; reduction in wear on all post combustion components (including but not limited to the turbo charger, oxidation catalyst, DPF, SCR CAT, sensors, and injectors within the post combustion system); increased longevity of exhaust components; and the protection of intake components downstream of the EGR, for example swirl flaps, throttles and the intake manifold (due to a reduction in the likelihood of blocking etc.).

Any feature of the invention may be combined with any other feature as appropriate.

The invention will now be further described with reference to the following non-limiting examples. In the examples which follow the values given in parts per million (ppm) for treat rates denote active agent amount, not the amount of a formulation as added, and containing an active agent. All parts per million are by weight.

EXAMPLE 1

The ability of the claimed additives to reduce the formation of deposits on a diesel particulate filter was assessed according to the following procedure.

The test vehicle was light goods vehicle (LGV) based on a Euro 6 compliant, 2.1 litre HSDI engine. The vehicle mileage prior to the test was approximately 100,000 miles.

The following modifications were made to the vehicle:

The vehicle fuel supply was modified to facilitate switch-over between different test fuels and to enable thermal conditioning of the fuel and measurement of fuel consumption.

The vehicle air intake system was modified to provide controlled combustion air at a known pressure and temperature.

Engine Operating Conditions

After engine start, the engine is driven to the following operating conditions where it is held for the duration of the test:

43% load @ 1500 RPM
Translated vehicle speed of 47.5-48.0 km/h

Dynamometer & Test Cell Equipment

The testing was carried out using a commercially available Hub Dynamometer and test cell. The vehicle controls were operated by a robot driver.

Method of Soot Deposition Measurement (DPF Loading)

The calculated quantity of soot in the DPF was extracted in real time from the vehicles Connected Area Network (CAN) using industry standard diagnostic tools.

Prior to each measured DPF loading cycle, a "conditioning" DPF loading cycle (approx. 3-hours duration) was carried out under identical operating conditions. The loading cycle was allowed to run until a 100% DPF load was reported by the ECU, at which point an automatic regeneration was allowed to happen. Immediately following the completion of the automatic regeneration the measured DPF loading cycle commenced. The time taken from the initiation of the "measurement" cycle to reaching 100% DPF load was recorded.

The purpose of the "conditioning" DPF loading cycle was to achieve a repeatable starting condition prior to each measured DPF loading cycle. The fuel to be tested was used to perform the "conditioning" cycle in each instance. The basic premise of the procedure is shown below:

Engine Start
Soot Load [1]-"Conditioning"
Automatic Regeneration
Soot Load [2]-"Measurement"
Automatic Regeneration
Engine Stop
Change to next test fuel The base fuel was an RF-06-03 diesel fuel (Haltermann Carless, UK) having the following specification:

| Feature | Units | Results | Minimum | Maximum | Method |
|---|---|---|---|---|---|
| Density 15° C. | kg/m$^3$ | 836.0 | 833.0 | 837.0 | ASTM D4052 |
| Marker (Red) | — | Pass | — | — | VISUAL |
| Cetane Number | | 53.9 | 52.0 | 54.0 | ASTM D613 |
| I.B.Pt. | ° C. | 214.3 | | | ASTM D86 |
| 10% v/v Recovered at | ° C. | 232.0 | | | ASTM D86 |
| 50% v/v Recovered at | ° C. | 275.5 | 245.0 | — | ASTM D86 |
| 90% v/v Recovered at | ° C. | 330.2 | | | ASTM D86 |
| 95% v/v Recovered at | ° C. | 348.0 | 345.0 | 350.0 | ASTM D86 |
| F.B.Pt. | ° C. | 356.2 | — | 370.0 | ASTM D86 |
| Aromatics by FIA | %(V/V) | 19.8 | Corrected for | | ASTM D1319 |
| Olefins by FIA | %(V/V) | 5.5 | | | |
| Flash Point, Pensky Closed | ° C. | 92.0 | 55.0 | — | ASTM D93 |
| Sulphur Content | mg/kg | <3.0 | — | 10.0 | ASTM D5453 |
| Viscosity at 40° C. | mm2/s | 3.062 | 2.300 | 3.300 | ASTM D445 |
| Cloud Point | ° C. | −18 | | | ASTM D2500 |
| CFPP | ° C. | −20 | — | −15 | EN 116 |
| Lubricity (WSD 1,4) at 60° C. | μm | 180 | — | 400 | ISO 12156-1 |
| Carbon Residue (on 10% Dist. Res) | %(m/m) | <0.10 | — | 0.20 | ASTM D4530 |
| Ash | %(m/m) | <0.001 | — | 0.010 | ASTM D482 |
| FAME Content: None Detected | — | Pass | — | — | EN 14078 |
| Polycyclic Aromatic Hydrocarbons | %(m/m) | 5.8 | 3.0 | 6.0 | EN 12916 |
| Total Aromatic Hydrocarbons | %(m/m) | 22.2 | | | EN 12916 |
| Water Content | mg/kg | 50 | — | 200 | IP 438 |
| Water & Sediment | %(V/V) | <0.010 | | | ASTM D2709 |
| Strong Acid Number | mg | 0 KOH/g | — | 0.02 | ASTM D974 |
| Oxidation Stability | mg | <0.1 per 100 ml | — | 2.5 | ASTM D2274 |
| Copper Corrosion, 3 hrs at 100° C. | — | 1 B | — | — | ASTM D130 |
| Oxygen Content | %(m/m) | <0.04 | ELEMENTAL | | Elemental Analysis |
| Carbon Content | %(m/m) | 86.89 | ASTM D5291 | | ASTM D5291 |
| Hydrogen Content | %(m/m) | 13.11 | ASTM D5291 | | ASTM D5291 |
| Carbon Weight Fraction | | 0.8689 | CALCULATION | | Calculation |
| C/H Mass Ratio | | 6.63 | CALCULATION | | Calculation |

| Feature | Units | Results | Minimum | Maximum | Method |
|---|---|---|---|---|---|
| Atomic H/C Ratio | | 1.7979 | CALCULATION | | Calculation |
| Atomic O/C Ratio | | <0.0003 | CALCULATION | | Calculation |
| Gross Heat of Combustion | MJ/kg | 45.72 | IP 12 | | IP 12 |
| Net Heat of Combustion | MJ/kg | 42.94 | IP 12 | | IP 12 |
| Net Heat of Combustion | btu/lb | 18460 | CALCULATION | | Calculation |

The additives used and the test results achieved are detailed in Table 1. The results are also represented in FIG. 1.

TABLE 1

| Additive | Treat rate (ppm active) | Time until DPF regeneration (hours:minutes) |
|---|---|---|
| None | — | 02:16 |
| 2-Ethylhexyl Nitrate (2-EHN) | 700 | 02:48 |
| Di-Tert Butyl Peroxide | 700 | 02:50 |

This showed that the inventive additives were effective in increasing the time until DPF regeneration, therefore they were effective in reducing the formation of deposits on a diesel particulate filter.

EXAMPLE 2

The ability of the claimed additives to reduce the formation of deposits on a diesel particulate filter was assessed according to the following procedure.

A Euro 6 compliant 2.0 litre HSDI engine was connected to a test automation system and test bed fitted with an engine dynamometer. The engine was controlled by an ECU supplied by the engine manufacturer. The engine configuration did not include any further exhaust aftertreatment.

For each cycle, the engine operating conditions consisted of two different speed and load points.
Stage #1 [DPF Loading]
19% load @ 1200 RPM
Stage #2 [DPF Regeneration]
37% load @ 1500 RPM
The base fuel was as for Example 1.

Method of Soot Deposition Measurement (DPF Loading)

The relative quantity of soot in the DPF was determined from external measurement of the differential pressure across the DPF via the test automation system. DPF regeneration commenced when a predetermined maximum differential pressure was obtained (corresponding to 100% DPF loading).

The engine oil was changed prior to performing the base fuel DPF loading cycles. Prior to each measured DPF loading cycle, the engine conducted a "conditioning" DPF loading cycle (approx. 7-hours duration) under identical operating conditions.

The basic premise of the procedure is shown below:
Engine Start
Soot Load [1]-"Conditioning"
Manual Regeneration
Soot Load [2]-"Conditioning"
Manual Regeneration
Soot Load [3]-"Measurement"
Manual Regeneration
Engine Stop
Change to next test fuel The time taken from the initiation of the cycle to reaching the predetermined maximum differential pressure (corresponding to 100% DPF loading) was recorded for the two "measurement" cycles, and an average of the two results is shown in Table 2 below.

TABLE 2

| Additive | Treat rate (ppm active) | Time until DPF regeneration (hours:minutes) |
|---|---|---|
| None | — | 06:11 |
| C10 alkyl nitrate | 700 | 06:53 |

The C10 alkyl nitrate was a commercially available alkyl nitrate derived from a branched C10 alcohol having an average of 2.0 branches per molecule.

The invention claimed is:

1. A method of reducing the impact of deposits in the post combustion system of a diesel engine, the method comprising:
    combusting in the engine a diesel fuel composition comprising as an additive a nitrate compound and/or a peroxide compound; and
    measuring the interval between regenerations of the diesel particulate filter, wherein the nitrate compound and/or peroxide compound reduces deposits in the post combustion system of the diesel engine and increases the interval between regenerations of the diesel particulate filter compared to when an otherwise identical fuel is combusted under identical conditions except for the inclusion of the post combustion deposit reducing additive.

2. The method according to claim 1, further comprising reducing the formation of deposits in the post combustion system of a diesel engine.

3. The method according to claim 1, wherein the additive is selected from alkyl nitrates and/or dialkyl peroxides.

4. The method according to claim 2, wherein the additive comprises a nitrate compound of formula (I):

wherein $R^1$ is an optionally substituted straight chain, branched or cyclic alkyl group.

5. The method according to claim 1, wherein the additive comprises a nitrate compound of formula (I):

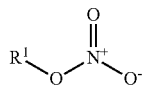
(I)

wherein R¹ is an optionally substituted alkyl, aryl or aralkyl group.

6. The method according to claim 1, wherein the additive comprises a nitrate compound of formula (I):

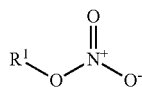
(I)

wherein R¹ is an unsubstituted alkyl group having 2 to 20 carbon atoms.

7. The method according to claim 2, wherein the additive comprises a compound of formula (II):

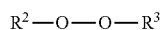
(II)

wherein R² is an optionally substituted alkyl, aryl, alkaryl, aralkyl or acyl group; and
R³ is hydrogen or an optionally substituted alkyl, aryl, alkaryl, aralkyl or acyl group.

8. The method according to claim 1, wherein the additive comprises a compound of formula (II):

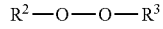
(II)

wherein R² and R³ are the same and each is an unsubstituted alkyl or acyl group having 1 to 12 carbon atoms.

9. The method according to claim 1, wherein the additive is selected from the group consisting of 2-ethylhexyl nitrate, a decyl nitrate and di-tert-butyl peroxide.

10. The method according to claim 6, wherein R¹ is a branched decyl group having an average degree of branching of from 1 to 2.5.

11. The method according to claim 1, wherein the diesel fuel composition comprises from 50 to 2000 ppm of alkyl nitrate and/or dialkyl peroxide compounds.

12. The method according to claim 1, wherein the diesel fuel composition comprises from 50 to 350 ppm alkyl nitrate and/or dialkyl peroxide compounds.

13. The method according to claim 1, further comprising reducing deposits in the post combustion system of a diesel engine having a pressure in excess of 1350 bar.

14. The method according to claim 1, further comprising reducing the formation of deposits on the turbocharger of the post combustion system.

15. The method according to claim 1, further comprising reducing the formation of deposits on the diesel oxidation catalyst of the post combustion system.

16. The method according to claim 1, further comprising reducing the formation of deposits on the diesel particulate filter of the post combustion system.

17. The method according to claim 1, further comprising reducing formation of deposits on the selective catalytic reduction unit of the post combustion system.

18. The method according to claim 1, further comprising reducing the formation of deposits on the ammonia oxidation catalyst of the post combustion system.

19. The method according to claim 1, further comprising reducing the formation deposits on sensors within the post combustion system.

20. The method according to claim 1, further comprising reducing the formation of deposits in one more components of the post combustion system by at least 5%.

21. The method according to claim 1, wherein the diesel fuel composition comprises one or more nitrogen containing detergents.

22. The method according to claim 21 wherein the one or more nitrogen containing detergents are selected from:
(i) a quaternary ammonium salt additive;
(ii) the product of a Mannich reaction between an aldehyde, an amine and an optionally substituted phenol; and
(iii) the reaction product of a carboxylic acid-derived acylating agent and an amine.

23. The method according to claim 1, wherein the diesel engine is an off road engine.

24. The method according to claim 1, further comprising providing one or more benefits selected from: an increase in power generation; an increase in torque; an increase in fuel economy; a reduction in emissions; a reduction in combustion chamber deposits; an acceleration improvement; driveability improvements; a reduction in cold start issues; lower soot formation; mitigation of lubricant degradation and/or performance loss; a reduction in diesel exhaust fluid and consumption; reduction in wear on all post combustion components; increased longevity of exhaust components; and the protection of intake components downstream of the EGR.

* * * * *